US012656233B2

(12) United States Patent
Pinno-Rath et al.

(10) Patent No.: US 12,656,233 B2
(45) Date of Patent: Jun. 16, 2026

(54) INDENTATION HEAD FOR AN INDENTATION INSTRUMENT

(71) Applicant: Anton Paar TriTec SA, Corcelles (CH)

(72) Inventors: Norbert Pinno-Rath, Gratwein-Straßengel (AT); Bertrand Bellaton, Neuchâtel (CH)

(73) Assignee: ANTON PAAR TRITEC SA, Corcelles (CH)

(*) Notice: Subject to any disclaimer, the term of this patent is extended or adjusted under 35 U.S.C. 154(b) by 308 days.

(21) Appl. No.: 18/450,197

(22) Filed: Aug. 15, 2023

(65) Prior Publication Data

US 2024/0060866 A1 Feb. 22, 2024

(30) Foreign Application Priority Data

Aug. 19, 2022 (EP) ..................................... 22191197

(51) Int. Cl.
G01N 3/02 (2006.01)

(52) U.S. Cl.
CPC ....... G01N 3/02 (2013.01); G01N 2203/0019 (2013.01); G01N 2203/0035 (2013.01); (Continued)

(58) Field of Classification Search
CPC .. G01N 3/42; G01N 3/46; G01N 3/40; G01N 2203/0019; G01N 2203/0035; G01N 2203/0076; G01N 2203/0078
See application file for complete search history.

(56) References Cited

U.S. PATENT DOCUMENTS 7,685,868 B2 * 3/2010 Woirgard ................. G01N 3/42
73/81
9,970,851 B2 5/2018 Bellaton et al.
(Continued)

FOREIGN PATENT DOCUMENTS

CN 107064198 A * 8/2017 ......... G01N 23/2251
JP 2003337094 A 11/2003
JP 2009063480 A * 3/2009

OTHER PUBLICATIONS

Machine translation of CN 107064198 A (Year: 2017).*
(Continued)

*Primary Examiner* — Nathaniel J Kolb
(74) *Attorney, Agent, or Firm* — NIXON & VANDERHYE

(57) ABSTRACT

An indentation head system for an indentation instrument includes: an indenter tip contacting a sample surface along at least an indentation axis; a reference element supporting the tip; a zero-level sensor generating a signal indicating whether the tip is displaced with respect to the reference element from a neutral relative position; an elastic element between the tip and an actuator with known elongation, the actuator connected to the reference element; and a controller receiving signals from the zero-level sensor to perform servo control of the actuator based on output of the zero-level sensor and the known elongation of the actuator so the zero-level sensor outputs a signal corresponding to a substantially zero displacement of the tip from the neutral relative position, the controller calculating a force applied by the tip to the sample based on an output of the displacement sensor and an elastic coefficient of the elastic element.

20 Claims, 3 Drawing Sheets

(52) U.S. Cl.
CPC ................ *G01N 2203/0078* (2013.01); *G01N 2203/0617* (2013.01); *G01N 2203/0682* (2013.01)

(56) References Cited

U.S. PATENT DOCUMENTS

| | | | | |
|---|---|---|---|---|
| 10,571,379 | B2 * | 2/2020 | Oliver ...................... | G01N 3/42 |
| 2009/0260427 | A1 * | 10/2009 | Woirgard ................ | G01N 3/42 |
| | | | | 73/85 |
| 2016/0153881 | A1 * | 6/2016 | Bellaton ................. | G01N 3/42 |
| | | | | 73/82 |
| 2017/0284912 | A1 * | 10/2017 | Oliver ...................... | G01B 7/22 |

OTHER PUBLICATIONS

Machine translation of JP 2009063480 A (Year: 2009).*
M. Bulut Coskun et al., "Zero displacement microelectromechanical force sensor using feedback control", Applied Physics Letters, vol. 104, No. 15, Apr. 14, 2014, 4 pages.
Yantao Shen et al., "Closed-Loop Optimal Control-Enabled Piezo-electric Mircoforce Sensors", IEEE/ASME Transactions on Mechatronics, vol. 11, No. 4, Aug. 1, 2006, 8 pages.
European Search Report for EP22191197 completed Jan. 20, 2023, 7 pages.

* cited by examiner

INDENTATION HEAD FOR AN INDENTATION INSTRUMENT

CROSS-REFERENCE TO RELATED APPLICATIONS

This application claims the priority under 35 USC 119(a) of European patent application EP22191197.7 filed on Aug. 19, 2022, the entirety of which is incorporated herein by reference.

TECHNICAL FIELD

The present invention relates to indentation testing, particularly to micro- and nano-indentation testing.

STATE OF THE ART

U.S. Pat. No. 9,970,851 describes an indentation head system in which an indenter and an atomic force microscopy (AFM) tip are simultaneously brought into contact with the surface of a sample. The AFM tip serves as a positional reference in the vertical direction, and displacement of the indenter tip with respect thereto is measured by means of a capacitive sensor. The indenter tip is arranged mechanically in series with an elastic element, and the shortening of this latter is measured by means of a further capacitive sensor, in order to determine the force applied on the sample by the tip.

This arrangement is bulky and complex, requires that two tips are brought into contact with the sample. Furthermore, due to the geometry of the system, the mass of the indenter tip is significant, rendering the arrangement less suitable for high dynamic force measurements in which the force is varied rapidly.

The aim of the present invention is thus to propose an indentation head system in which the above-mentioned drawbacks are at least partially overcome.

DISCLOSURE OF THE INVENTION

More precisely, the invention relates to an indentation head system for an indentation instrument, as defined in claim 1. This indentation head system comprises an indenter tip of any known shape adapted to be brought into contact with a surface of a sample along at least an indentation axis, as well as a reference element arranged to support said indenter tip and serving as a positional reference for the relative position of the indenter tip.

According to the invention, said indentation head system further comprises:

a zero-level sensor arranged to output a signal indicating whether said indenter tip is displaced with respect to said reference element from a neutral relative position in reference thereto, considered along said indentation axis (i.e. whether the indenter tip has been displaced from its initial, unstressed relative position with respect to the reference element). Zero-level sensor may be optical, electrostatic, magnetic, capacitive, inductive or any other suitable type of sensor;

an elastic element, such as a linearly-acting spring (e.g. a coil spring), blade flexure or similar, connected between said indenter tip and an actuator (which is typically but not exclusively a piezoelectric actuator) with known elongation (whether by having a good level of reproducibility on its extension in response to a control signal or by means of a displacement sensor arranged to measure the extension of the actuator), said actuator being directly or indirectly connected to said reference element;

a controller adapted to receive signals from said zero-level sensor to carry out servo control of said actuator such that said zero-level sensor outputs a signal corresponding to a substantially zero displacement of said indenter tip from said neutral relative position, said controller being furthermore adapted to calculate a force applied by said indenter tip to said sample on the basis of said known elongation of said actuator and an elastic coefficient of said elastic element, e.g. on the basis of Hooke's Law.

As a result, due to the fact that the actuator can be servo controlled to maintain a substantially constant relative position of the indenter tip with respect to the reference element as force is applied thereto by the sample, the indentation tip has a quasi-infinite stiffness which improves indentation measurement accuracy and precision. Indentation depth and indentation force measurements can also be measured independently of one another, further increasing accuracy and precision, and in certain configurations the inertia of the tip can be minimized, permitting relatively high dynamic force measurements. Furthermore, the force range and/or the absolute value of the force noise can be determined simply by varying the stiffness of the elastic element, provided this force is within the capability of the actuator.

Advantageously, the indentation head system further comprises a displacement sensor arranged to measure said elongation of said actuator and to transmit corresponding measurements to said controller for use in carrying out said servo control. Typically, this sensor is a capacitive displacement sensor or an LVDT (linear variable differential transformer) sensor, but also high resolution optical displacement sensors such as interferometers are also possible.

Advantageously, said elastic element and said indentation tip are integrated with each other and are exchangeable. This enables easy exchange of the indentation tip for different shapes of tips, different force ranges to be measured by means of providing different elastic element stiffnesses, and so on, each integrated indenter tip/elastic element pair being exchanged as a unit.

Advantageously, said zero-level sensor is arranged to also be able to measure a tilt of said indenter tip, which also permits measurements of lateral force during a scratch or tribological test.

In one variant, said elastic element is a spring arranged to act linearly.

In another variant, said elastic element comprises at least one blade flexure arranged to act in bending, or a membrane.

In one variant, said zero-level sensor is arranged to directly measure a displacement of said indenter tip with respect to said reference element, e.g. by optical means, which minimizes the inertia of the indenter tip/elastic element assembly.

Advantageously, said zero-level sensor is arranged to measure a bending of a flexure guiding said tip, said flexure being a membrane or at least one blade flexure.

Advantageously, said zero-level sensor is an optical sensor such as a light lever sensor optically measuring the tilt of a lever mechanically connected to the tip, and/or said actuator is a piezoelectric actuator, and/or said displacement sensor is a capacitive sensor.

The indentation head system of the invention can be integrated into an indentation system together with a sample holder arranged to hold a sample facing said indenter tip.

Such a sample holder is typically configured to be movable along at least three axes of translation, and typically also provides a positional output.

Advantageously, said indentation sensor further comprises a penetration depth sensor arranged to either:

measure a relative displacement between said reference element and a reference tip in contact with said sample; or measure a relative displacement between said indenter tip and a reference tip in contact with said sample.

Advantageously, said indentation system further comprises a headstock actuator arranged to displace said reference element along said indentation axis with respect to a stationary frame element. In such a case, a penetration depth sensor configured to measure an elongation of said headstock actuator can be provided.

The invention further relates to a method of operation of an indentation system as mentioned above. This method comprises steps of:

positioning a sample on said sample holder facing said indenter tip; subsequently bringing said indenter tip into contact with a surface of said sample; subsequently generating relative movement between said sample and said indenter tip at least along said indentation axis while maintaining an output of said zero-level sensor corresponding to substantially zero displacement of said indenter tip from said neutral relative position, by controlling said actuator (i.e. to make it extend in a controlled manner); subsequently measuring force applied between said sample and said indenter tip on the basis of an output of said displacement sensor and said elastic coefficient of said elastic element.

Advantageously, relative movement between said sample and said indenter tip is also generated in a direction perpendicular to said indentation axis, a force applied by said indenter tip on said sample perpendicular to said indentation axis being measured. Lateral force measurements for scratch and tribological tests can hence be made.

BRIEF DESCRIPTION OF THE DRAWINGS

Further details of the invention will become more apparent upon reading the following description, with reference to the following figures in which.

EMBODIMENTS OF THE INVENTION

Figure 1:
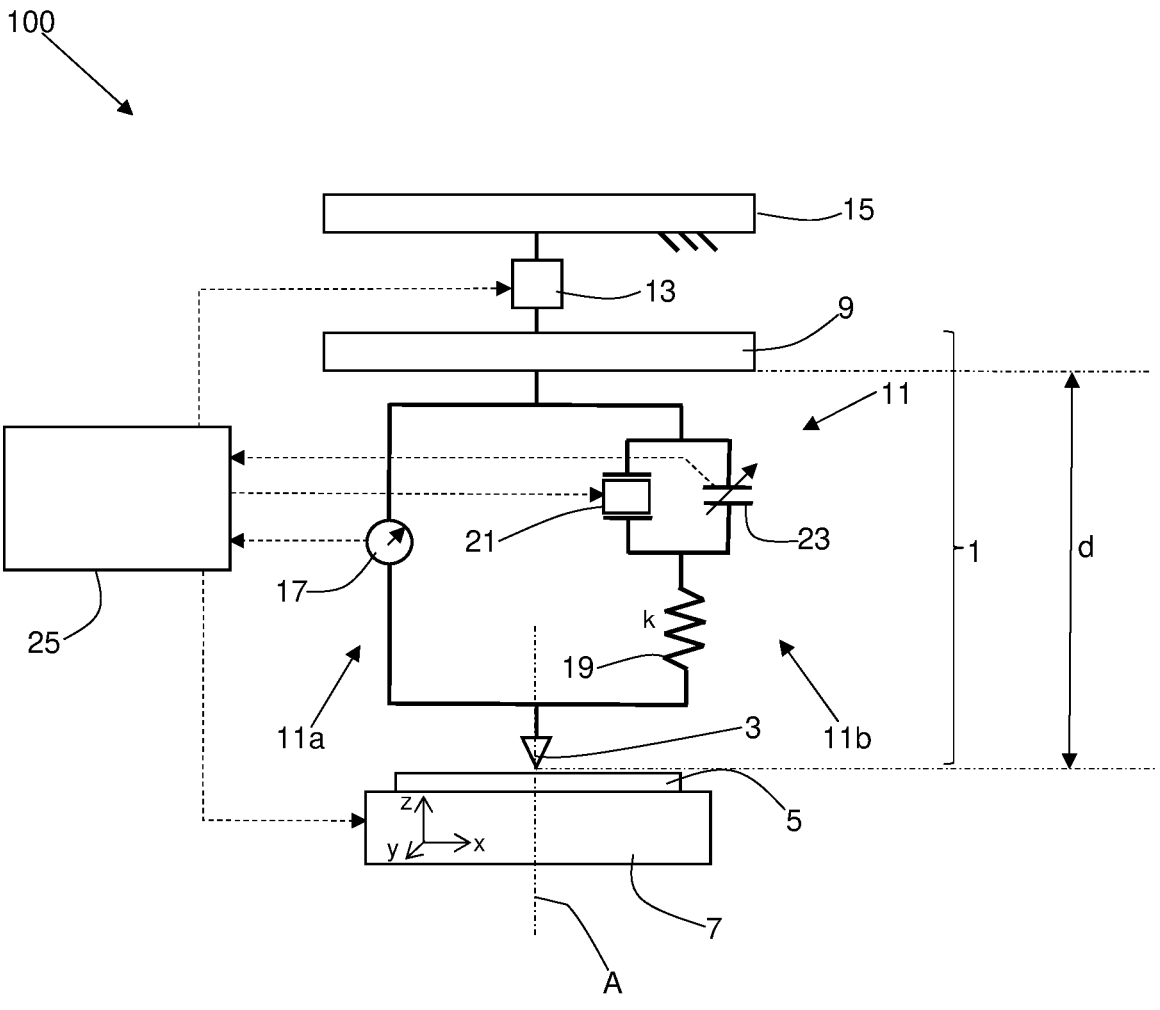
FIG. 1 is a schematic view of an indentation system comprising an indentation head system according to the invention.

FIG. 1 illustrates a schematic view of an indentation system 100 comprising an indentation head system 1 according to the invention. This indentation system is primarily intended for nanoindentation operations, that is to say with vertical (z-direction) displacements in the nanometer range, but the same principle can be applied to microindentation, with vertical (z-direction) displacements in the micrometer range. Furthermore, the indentation system 100 can also be used to carry out scratch testing, tribological testing and so on.

Indentation head system 1 comprises an indenter tip 3 intended to be brought into contact with a sample 5 positioned on a sample holder 7 and held sufficiently rigidly thereto that it cannot move with respect to the sample holder 7 during a test. Sample holder 7 may be stationary, or movable about one, two or three axes of translation, and/or about one, two or three axes of rotation, and typically provides a positional output, as is generally known. The primary direction of action of the indenter tip 3 during an indentation test is along an indentation axis A, which is parallel to the z axis as illustrated in the figures. This direction is substantially perpendicular to the plane of the sample holder 7, although this is not obligatory.

Indenter tip 3 is attached to a reference element 9 by means of a measurement system 11. Reference element 9 is simply a substantially rigid part of the indentation head system 1 to which the tip 3 is indirectly attached as described below, and may be directly fixed to a stationary frame element so as to be stationary, or, as illustrated, may be linked to a stationary frame element 15 by means of a headstock actuator 13 adapted to move the reference element 9 at least vertically (i.e. along the z-direction) with respect to the stationary frame element 15. In essence, the reference element 9 is the supporting element for the indenter tip 3 and the components between the reference element 9 and the indenter tip 3, and serves as a reference for relative displacement of the indenter tip 3 with respect thereto.

The core of the invention resides in the arrangement of the measurement system 11, part of which physically links the indentation tip 3 to the reference element 9.

This is arranged in two functionally parallel subsystems 11a, 11b, the first 11a comprising a zero-level sensor. Such a sensor is functionally arranged between the indenter tip 3 and the reference element 9, so as to give an output as to whether the displacement it is measuring, in this case the vertical (z-direction) displacement of the indenter tip 3 with respect to the reference element 9, is zero (i.e. a neutral relative position), positive or negative. Such sensors can be conventional displacement sensors, but there are certain types of zero-level sensors which cannot measure absolute displacement well at all, but which give excellent precision and reproducibility around the zero point, in order to precisely identify this zero point. Various preferred examples are discussed below in connection with FIGS. 5-8.

The second parallel subsystem 11b physically links the indenter tip 3 to the reference element 9, and is arranged functionally in parallel to the first parallel subsystem 11a.

The second parallel subsystem 11b comprises an elastic element 19 in series with an actuator 21 arranged in parallel with a displacement sensor 23, this latter being arranged to measure the elongation of the actuator 21 under the control of the controller 25. Elastic element 19 has an elastic coefficient (i.e. spring coefficient) of k, and can be adapted according to the type of indenter tip 3 and the forces intended to be applied during a test. This enables easy scaling of the force range to be applied, stiffer elastic elements 19 generating greater forces than softer elastic elements 19. Furthermore, the absolute value of the force noise (i.e. the error in the force measurement) can be changed by using a stiffer or weaker elastic element 19, stronger elastic elements generating a greater force range and greater absolute force noise, and vice-versa.

As illustrated, the elastic element 19 is proximate to the indenter tip 3, the actuator 21 and displacement sensor 23 being proximate to the reference element 9, but the opposite configuration is also possible yet is not preferred. However, the illustrated configuration is preferred, since the elastic element 19 can be integrated with the indenter tip 3, e.g. so as to be able to be exchangeable as a unit with the elastic constant k adapted to the shape of the indenter tip 3 and the intended use case. Furthermore, this arrangement permits the inertia of the indenter tip 3 and elastic element 19 to be minimized. Although elastic element 19 is illustrated as a linear spring, springs acting in torsion or bending are also possible.

One or more lateral force sensors arranged to measure forces applied by the indenter tip 3 in the XY plane may also be provided.

The indentation head system 1 further comprises a controller 25, adapted to receive signals from the zero-level sensor 17 and the displacement sensor 23, and to control at least the actuator 21, according to the method which will be elaborated below. Data/command connections are indicated with dashed-line arrows.

The controller 25 may also control the displacements of sample holder 7, as well as headstock actuator 13 (if present).

In order to make an indentation measurement, which may be a simple indentation measurement, scratch test, tribological test or similar, the indenter tip 3 is first brought into contact with the surface of a sample 5 supported on the sample holder 7.

The indenter tip is then driven into the surface of the sample 5 (which is optionally also translated laterally in the x and/or y direction(s)) by means of movement of the sample holder 7 and/or the headstock actuator 13 (if present). While this is carried out, the controller commands the actuator 21 to maintain a substantially zero reading on the zero-level sensor 17 (i.e. to maintain the indenter tip 3 in a constant z-axis position with respect to the reference element 9) by means of servo control (the servo control loop comprising the zero-level sensor 17, the actuator 21 and the controller 25), while the displacement sensor 23 measures the extension of the actuator 21.

The controller 25 then computes the force applied based on the extension of the actuator 21 as measured by the displacement sensor 23, and a priori knowledge of the elastic coefficient k of the elastic element 19.

As can be seen from the foregoing, the indenter tip 3 remains substantially at a constant distance d with respect to the reference element 9 at least in the z direction (parallel to the indentation axis), the reaction to the indentation force compressing the elastic element 19 against the counterforce provided by the actuator 21. The indenter head system is hence quasi-infinite stiffness, since any attempted displacement of the indenter tip 3 with respect to the reference element 9 is counteracted by the actuator 21, under servo control carried out by the controller 25, and hence the apparent stiffness of the indenter tip 3 is quasi-infinite. Furthermore, indentation depth and indentation force measurements can be measured independently of one another, indentation depth being measured e.g. on the basis of the relative movement of the sample holder with respect to the reference element (one of which remains stationary and the other of which moves), or via a supplementary penetration depth sensor.

Figures 2, 3, 4:
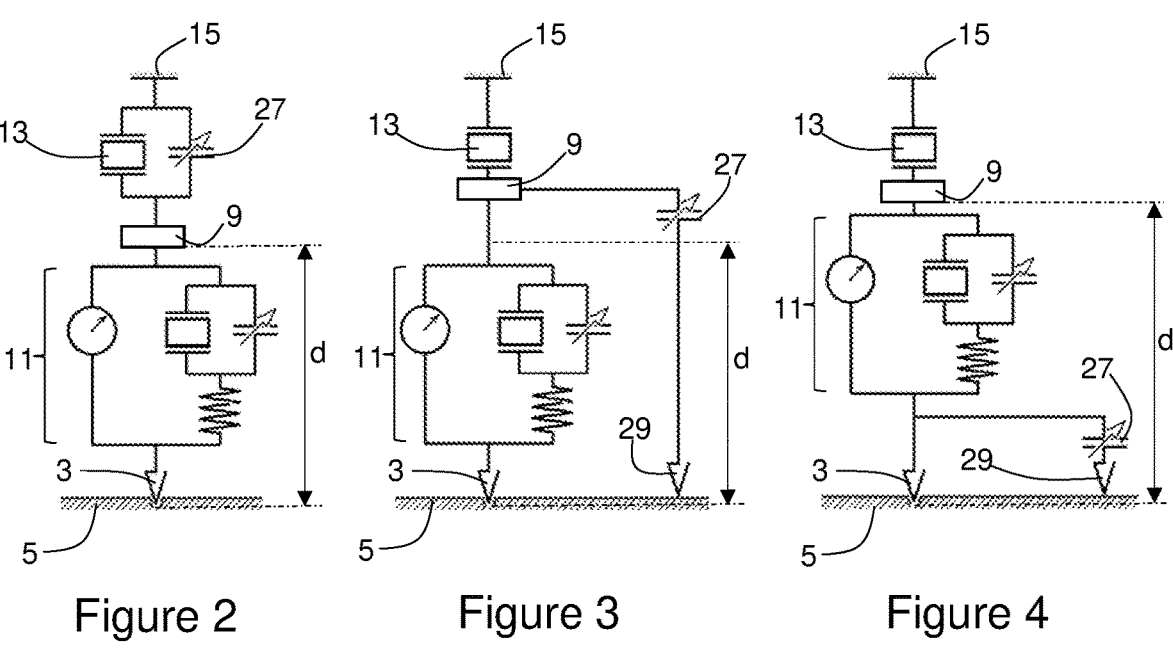
FIG. 2 is a schematic view of part of an indentation system according to the invention, with a first arrangement of penetration depth sensors.
FIG. 3 is a schematic view of part of an indentation system according to the invention, with a second arrangement of penetration depth sensors.
FIG. 4 is a schematic view of part of an indentation system according to the invention, with a third arrangement of penetration depth sensors.

FIGS. 2, 3 and 4 illustrate, in partial views, various ways of measuring indentation depth with adaptations of the indentation system 100 of FIG. 1. On these figures, only the functional elements have been illustrated, the connections with the controller 25 having been omitted and the measurement system 11 simply being indicated with a single reference sign in order to not clutter the figures.

In the arrangement of FIG. 2, a penetration depth sensor 27 is provided in such a manner as to measure the extension of headstock actuator 13. The penetration depth sensor 27 may be capacitive, optical, electrostatic, piezoelectric or any other type of sensor capable of measuring a variable displacement, i.e. the change in length of the headstock actuator 13. In this arrangement, if the stationary frame element 15 is stiff and the measurement system is also effectively stiff under servo control as discussed above, the extension of the headstock actuator 13 corresponds to the penetration of the indenter tip 5 into the surface of the sample 5.

This arrangement permits very high rates of force cycling, since the mass of moving parts attached to the indenter tip 3 can be minimized.

In the arrangement of FIG. 3, a reference tip 29 is provided. Reference tip 29 is adapted to be brought into contact with the surface of the sample 5 but not to penetrate into it, and is attached to the reference element 9. A penetration depth sensor 27 is provided, which is arranged to measure the vertical movement of the reference tip 29 with respect to the reference element 9. The same types of penetration depth sensor 21 can be used as indicated above, and depending on the type may be arranged in series or parallel to the reference tip 29. This arrangement eliminates all uncertainty other than in the measurement system 11, but does require the use of a reference tip 29.

In the arrangement of FIG. 4, a reference tip 29 is provided in parallel to the indenter tip 3, attached to the indenter tip end of the measurement system 11. A penetration depth sensor 27 is further provided, and is arranged to measure the displacement of the reference tip 29 with respect to the indenter tip 3. Although this is the most precise manner to measure indentation depth, the inertia of the reference tip 29 and any parts of the penetration depth sensor 27 which are attached directly or indirectly to the indenter tip 3 increase the inertia which is required to be overcome to displace the indenter tip 3, which reduces the maximum acceleration rate and hence cycling frequency of the indenter tip 3. However, exchangeable tip modules which incorporate both the indenter tip 3 and the reference tip 29 can be provided with such a configuration.

Figures 5, 6, 7:
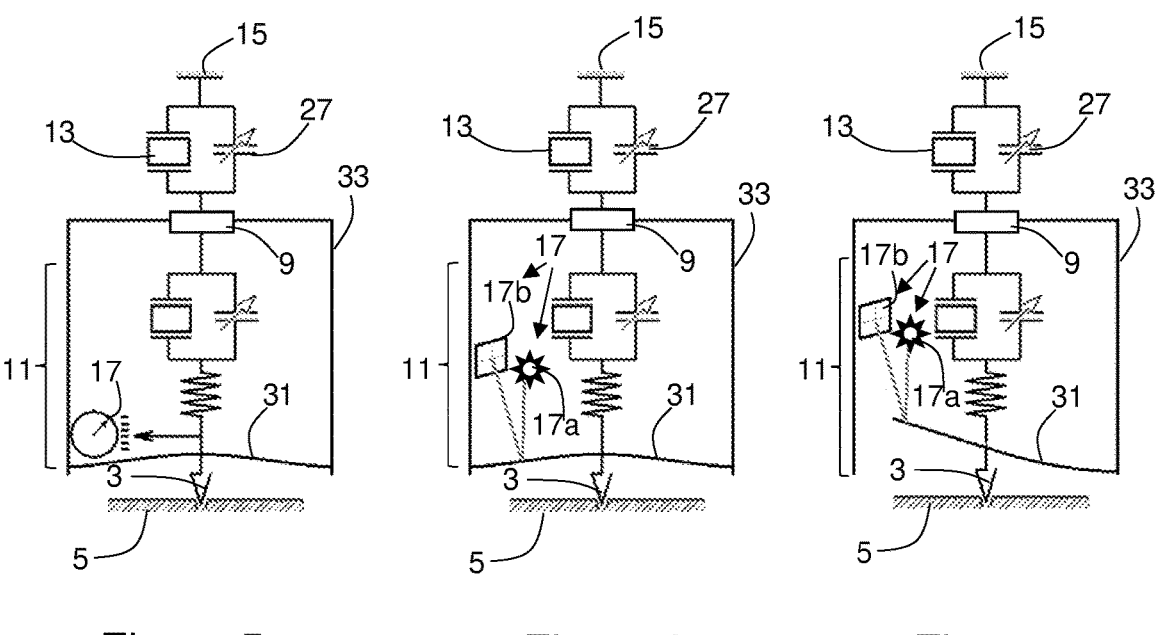
FIG. 5 is a schematic view of part of an indentation system according to the invention, with a first arrangement of zero-level sensors.
FIG. 6 is a schematic view of part of an indentation system according to the invention, with a second arrangement of zero-level sensors.
FIG. 7 is a schematic view of part of an indentation system according to the invention, with a third arrangement of zero-level sensors.

FIGS. 5-7 illustrate adaptations of systems corresponding to FIGS. 1 and 2, showing particular ways in which the zero-level sensor can be arranged.

In FIGS. 5 and 6, the indenter tip 3 is supported by a flexure 31, which serves to guide the tip 3 to remain substantially on the indentation axis A. This flexure 31 is supported on a frame 33 rigidly attached to the reference element 9 may be a flexible membrane or two, three, four or more sub-flexures arranged rotationally-symmetrically, and has a stiffness along the indentation axis which is relatively small compared to the elastic element 19. However, since the flexure 31 will be kept substantially at its neutral relative position by means of the servo loop as discussed above, its relatively small stiffness does not negatively affect the measurement accuracy. It should be noted that if the stiffness of the flexure 31 is too great, the sensitivity of the operation of the servo loop is reduced, and the skilled person can carry out experiments to optimize the stiffness to find a suitable compromise.

In the arrangement of FIG. 5, the zero-level sensor 17 directly measures the position of the indenter tip 3 along the indentation axis, by mechanical, optical, electrostatic, capacitive, piezoelectric or other suitable means.

In the arrangement of FIG. 6, zero-level sensor 17 is an optical sensor of any convenient type, which is arranged to measure the angle of tilt of flexure 31 with optical means. The arrangement of FIG. 7 is similar to that of FIG. 6, except that the flexure 31 is a cantilevered blade flexure.

More specifically, in respect of FIGS. 6 and 7, the zero-level sensor 17 comprises a light source 17a arranged to direct light (illustrated with a grey line) onto a portion of the flexure 31 which will tilt in response to displacement of the indenter tip 3 with respect to the reference element 9 along the indentation axis. Light is reflected off the flexure 31 such that it is received by an optical detector 17b. Due to force acting on the indenter tip 3, the free end flexure 31 will incline, causing the reflected light to impact a different part of the optical detector 17b, which may e.g. comprise several photodiodes, charge coupled devices or similar arranged to this effect as either a linear or matrix detector. This arrangement is typically referred to a "light lever sensor". As illustrated, the light source 17a may be e.g. a laser, a substantially collimated LED light source, or similar. A mirror may be affixed to the flexure 31 to reflect the light beam, or the surface finish (e.g. polishing) of the flexure 31 may be sufficient to reflect it. Alternatively, laser-interferometry, optical triangulation or a confocal chromatic sensor can be used to the same effect.

Other optical measurement arrangements which can be applied include an auto-collimator arrangement focusing light onto a reflective portion of the flexure 31 or a mirror carried by it, or a moving aperture attached to the flexure 31 which casts a shadow on the optical detector 17b which detects movement of the shadow.

Furthermore, if the flexure 31 is arranged to tilt around two axes, and the optical sensor 17b is two-dimensional (i.e. comprised of a matrix of individual detectors such as photodiodes), then lateral displacement (perpendicular to the indentation axis) can also be detected, as is useful in the case of scratch or tribological tests.

In any case, the output of the sensor 17 should be representative of the displacement of the indenter tip 3, i.e. that there should be only a single condition which results in the sensor 17 outputting zero (i.e. only one combination of indentation force and compensation force from the actuator 21).

In an advantageous implementation, the flexure 31 guiding the indenter tip 3 and/or the elastic element 19 are made of silica, as the ratio between density and Youngs-modulus is favourable.

Figure 8:
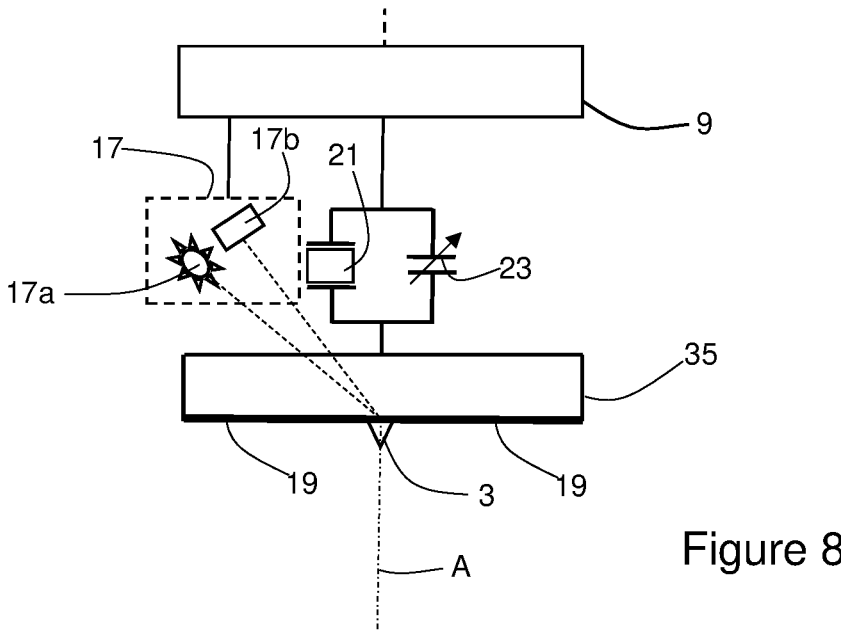
FIG. 8 is a schematic view of part of an indentation system according to the invention, with a particular arrangement of elastic element.

FIG. 8 illustrates a variation of a system according to the invention implementable in analogy to the arrangements of FIGS. 2-4 and differing therefrom in that the elastic element 19 is formed as at least one flexure (e.g. a flexible membrane, one or more blade flexures or similar) supported by a frame 35. Again, the displacement of the indenter tip 3 is measured in the vertical direction by any suitable type of zero-level sensor 17 linked to the reference element 9 and chosen from those discussed above, although an optical arrangement has been illustrated. Since the elastic element 19 will by definition deform in bending during operation, the measurement of the indenter tip 3 displacement must be carried out on a part rigidly attached to the indenter tip 3.

This arrangement is bulkier than those discussed above, but the orientation of the indenter tip 3 with respect to the surface of the sample 5 remains constant as the blade flexures bend when the force applied by the indenter tip 3 to the sample 5 increases.

In this arrangement, if the zero-level sensor 17 can also measure a tilt of the indenter tip 3, it can also measure lateral force in the case of a scratch or tribological test.

In all of the above cases the elastic element 19 and indenter tip 3 can be integrated together as a tip module, which permits easy exchange and easy adaptation of the force range applied by the tip, of the shape of the tip, and so on.

Considering now the actuator 21, typically this is a piezoelectric actuator, since such actuators are relatively small, have a very fast response, are very stiff and create little heat. Alternatively, a voice coil or electrostatic actuator is also possible, however in such cases an effective stiffness has to be generated by means of a servo loop.

Displacement sensor 23 measures the value of the elongation of the actuator 21, and as a result should have good accuracy and precision to quantify this correctly. Capacitive displacement sensors and LVDT sensors are preferred, but also high resolution optical displacement sensors such as interferometers are also possible.

Furthermore, the indentation head system 1 of the invention should be dynamic enough to also perform many different imaging modes, such as from atomic force microscopy (AFM) in contact mode, tapping mode, PFM mode, etc, with decent performance, obviating the need for a separate imaging module in the indentation instrument 100.

Although the invention has been described in terms of specific embodiments, variations thereto are possible without departing from the scope of protection as defined by the appended claims.

The invention claimed is:

1. Indentation head system for an indentation instrument, comprising:
    an indenter tip adapted to be brought into contact with a surface of a sample along at least an indentation axis;
    a reference element arranged to support said indenter tip;
    wherein said indentation head system further comprises:
    a zero-level sensor arranged to output a signal indicating whether said indenter tip is displaced with respect to said reference element from a neutral relative position, considered along said indentation axis;
    an elastic element connected between said indenter tip and an actuator with known elongation, said actuator being connected to said reference element;
    a controller adapted to receive signals from said zero-level sensor to carry out servo control of said actuator based on output of said zero-level sensor and said known elongation of said actuator such that said zero-level sensor outputs a signal corresponding to a substantially zero displacement of said indenter tip from said neutral relative position, said controller furthermore being adapted to calculate a force applied by said indenter tip to said sample on the basis of an output of said known elongation of said actuator and an elastic coefficient of said elastic element.

2. The indentation head system according to claim 1, further comprising a displacement sensor arranged to measure said known elongation of said actuator and to transmit corresponding measurements to said controller for said servo control.

3. The indentation head system according to claim 2, wherein at least one of the following is true:

said zero-level sensor is an optical sensor;

said actuator is a piezoelectric actuator;

said displacement sensor is a capacitive sensor.

4. Indentation system comprising:

the indentation head system according to claim 2; and a sample holder arranged to hold a sample facing said indenter tip.

5. The indentation system according to claim 4, further comprising a penetration depth sensor arranged to measure a relative displacement between said reference element and a reference tip in contact with said sample.

6. The indentation system according to claim 4, further comprising a headstock actuator arranged to displace said reference element along said indentation axis with respect to a stationary frame element.

7. The indentation system according to claim 6, further comprising a penetration depth sensor configured to measure an elongation of said headstock actuator.

8. Method of operation of an indentation system, comprising:

providing the indentation system of claim 4;

positioning a sample on said sample holder facing said indenter tip;

bringing said indenter tip into contact with a surface of said sample;

generating relative movement between said sample and said indenter tip at least along said indentation axis while maintaining an output of said zero-level sensor corresponding to substantially zero displacement of said indenter tip from said neutral relative position, by servo-controlling said actuator;

measuring force applied between said sample and said indenter tip on the basis of an output of said displacement sensor and said elastic coefficient of said elastic element.

9. The method according to claim 8, in which relative movement between said sample and said indenter tip is also generated in a direction perpendicular to said indentation axis, and in which a force applied by said indenter tip and said sample perpendicular to said indentation axis is measured.

10. Indentation system according to claim 4, further comprising a penetration depth sensor arranged to measure a relative displacement between said indenter tip and a reference tip in contact with said sample.

11. The indentation head system according to claim 2, wherein said elastic element and said indentation tip are integrated with each other so as to be exchangeable as a unit.

12. The indentation head system according to claim 2, wherein said zero-level sensor is arranged to also be able to measure a tilt of said indenter tip.

13. The indentation head system according to claim 1, wherein said elastic element and said indentation tip are integrated with each other so as to be exchangeable as a unit.

14. The indentation head system according to claim 13, wherein said zero-level sensor is arranged to also be able to measure a tilt of said indenter tip.

15. The indentation head system according to claim 1, wherein said zero-level sensor is arranged to also be able to measure a tilt of said indenter tip.

16. The indentation head system according to claim 1, wherein said elastic element is a spring arranged to act linearly.

17. The indentation head system according to claim 1, wherein said elastic element comprises at least one blade flexure or membrane arranged to act in bending.

18. The indentation head system according to claim 1, wherein said zero-level sensor is arranged to directly measure a displacement of said indenter tip.

19. The indentation head system according to claim 1, wherein said zero-level sensor is arranged to measure a bending of a flexure guiding said tip, said flexure being a membrane or at least one blade flexure.

20. The indentation head system of claim 1, wherein the zero-level sensor is configured to output the signal indicating whether the indenter tip is displaced with respect to the reference element from the neutral relative position so that the signal is one of:

value 0, indicating that the indenter tip is in the neutral position;

a positive value, indicating that the indenter tip is displaced away from the neutral position in a first direction along the indentation axis; and a negative value, indicating that the indenter tip is displaced away from the neutral position in a second direction, opposite the first direction, along the indentation axis.

* * * * *